United States Patent
Evans et al.

(10) Patent No.: US 6,171,515 B1
(45) Date of Patent: Jan. 9, 2001

(54) FIBER TREATMENT COMPOSITION CONTAINING AMINE-, POLYOL-, FUNCTIONAL SILOXANES

(75) Inventors: Martin John Evans, S. Wales (GB); Howard Edwin Griffin, Greensboro, NC (US); Raymond Kemp, Barry (GB); Linda Denise Kennan; Kenneth Edward Zimmerman, both of Midland, MI (US)

(73) Assignees: Dow Corning Corporation, Midland, MI (US); Dow Corning, Ltd., Barry (GB)

( * ) Notice: Under 35 U.S.C. 154(b), the term of this patent shall be extended for 0 days.

(21) Appl. No.: 09/389,142

(22) Filed: Sep. 2, 1999

(51) Int. Cl.⁷ .................. D06M 15/643; D06M 23/00
(52) U.S. Cl. .............. 252/8.81; 252/8.82; 252/8.83; 252/8.84; 252/8.85; 252/8.86; 427/387; 428/365; 428/391
(58) Field of Search ................ 252/8.81, 8.82, 252/8.83, 8.84, 8.85, 8.86; 427/387; 428/365, 391

(56) References Cited

U.S. PATENT DOCUMENTS

| | | | |
|---|---|---|---|
| 3,890,269 * | 6/1975 | Martin | 528/14 |
| 4,311,626 | 1/1982 | Ona et al. | 260/29.2 M |
| 4,359,545 * | 11/1982 | Ona et al. | 524/262 |
| 4,409,267 | 10/1983 | Ichinohe et al. | 427/387 |
| 4,427,815 * | 1/1984 | Ona et al. | 252/8.61 |
| 4,599,438 * | 7/1986 | White et al. | 556/439 |
| 4,624,676 * | 11/1986 | White et al. | 8/115.56 |
| 4,661,577 * | 4/1987 | Lane et al. | 427/387 |
| 4,680,366 | 7/1987 | Tanaka et al. | 528/27 |
| 4,705,704 * | 11/1987 | Lane et al. | 427/389.9 |
| 4,757,121 | 7/1988 | Tanaka et al. | 528/27 |
| 5,100,991 | 3/1992 | Cray et al. | 528/26 |
| 5,118,535 | 6/1992 | Cray et al. | 427/387 |
| 5,132,443 * | 7/1992 | Traver et al. | 556/425 |
| 5,593,611 | 1/1997 | Czech | 252/8.63 |
| 5,707,434 * | 1/1998 | Halloran et al. | 106/287.11 |
| 5,707,435 * | 1/1998 | Halloran | 106/287.11 |
| 5,925,469 * | 7/1999 | Gee | 428/447 |
| 5,925,779 * | 7/1999 | Cray et al. | 556/425 |

FOREIGN PATENT DOCUMENTS

0399706A2  11/1990  (EP) .................. D06M 15/643

OTHER PUBLICATIONS

"Structure Activity Relationships of Aminofunctional Siloxanes as Components in Softening Finishes", Textile Chemist and Colorist, By Lautenschlager, et al., published Mar. 1995, vol. 27, No. 3., pp 27–29.

* cited by examiner

Primary Examiner—Anthony Green
(74) Attorney, Agent, or Firm—Timothy J. Troy; Charles R. Richard

(57) ABSTRACT

A fiber treatment composition is disclosed. The composition contains siloxanes having amine-, polyol-, functionalities. The composition provides good hand, resistance to yellowing, and hydrophilicity to the fibers. The composition is preferably formulated as an aqueous emulsion. Applying the composition to textile fabrics produces treated fabrics having good hydrophilicity, good hand, and resistance to yellowing.

17 Claims, No Drawings

FIBER TREATMENT COMPOSITION CONTAINING AMINE-, POLYOL-, FUNCTIONAL SILOXANES

FIELD OF THE INVENTION

The invention relates to a fiber treatment composition that provides the fiber with hydrophilicity, softness, and resistance to yellowing. More particularly, this invention relates to a fiber treatment composition containing amine-, polyol-, functional siloxanes.

BACKGROUND OF THE INVENTION

There is a growing need in the textile market for siloxane fabric softeners that not only provide softening but also impart hydrophilicity and other desirable properties to the treated fabric. Using a conventional siloxane polymer as the active ingredient in a fabric treatment agent often requires a trade-off in properties.

Amine-functional polysiloxanes are known to improve the hand of textiles. 'Hand' means the softness and smoothness of the textile. The hand of a treated textile is directly related to the amine content (e.g., the number of amino-functional groups) of the polysiloxane. Generally, as the amine content increases, the hand of the textile improves.

One method to produce amine-functional siloxane compounds for use as fabric treatment agents is to react an epoxy-functional silicone with an amine-functional organic compound. This method is described in U.S. Pat. No. 4,409,267 to Ichinohe et al., Oct. 11, 1983, which discloses a fabric treatment composition. The organopolysiloxane is prepared by a process comprising: 1) reacting a silanol-functional organopolysiloxane with a polyoxyalkylene compound and an epoxy-functional compound, by addition reaction and thereafter 2) reacting an amine compound with the epoxy group of the epoxy-functional organopolysiloxane, by addition or condensation reaction. The reactions are typically carried out in the presence of a solvent. The solvent and any impurities formed during reaction must then be removed. This method suffers from the drawback that unsubstituted amine groups can be present, which cause yellowing when the organopolysiloxane is applied to fabrics.

U.S. Pat. No. 5,593,611 to Czech, Jan. 14, 1997, discloses a fabric treatment composition comprising an aminopolysiloxane. The aminopolysiloxane is prepared by hydrolyzing and condensing an amino-functional dialkoxysilane with water in the presence of heat and a base catalyst. The aminopolysiloxane is hydrophobic and has a molecular weight of at least 30,000.

U.S. Pat. No. 4,757,121 to Tanaka et al., Jul. 12, 1988, discloses a fiber softening composition for synthetic fibers. The composition contains a combination of 2 different amino-substituted organopolysiloxanes, an epoxy-substituted alkoxysilane, and a monoepoxy compound. The first amino-substituted organopolysiloxane is terminated with a hydroxy group or alkoxy group that reacts with the epoxy-containing alkoxysilane. This forms a film of a crosslinked composition on the fiber surface. The second amino-substituted alkoxysilane is trialkyl-silyl terminated, and the second organopolysiloxane is prepared by reacting an amino-containing organopolysiloxane with a liquid organic epoxy compound.

U.S. Pat. No. 4,680,366 to Tanaka et al., Jul. 14, 1987, discloses a fabric finishing agent containing an organopolysiloxane with primary and secondary amine-functional hydrocarbon groups and polyoxyalkylene groups. The organopolysiloxane can be emulsified in water and applied to fabric to provide softness and anti-static properties. The organopolysiloxane is prepared by reacting a polyoxyalkylene glycidyl ether with an amino-functional organopolysiloxane.

However, the amine-functional polyorganosiloxanes suffer from the drawback that as the amine content of the polyorganosiloxane increases, the tendency of the textile to discolor or yellow increases. Additionally, the amine-functionality tends to impart hydrophobicity to the treated textile.

To minimize yellowing, it has been the practice in the textile industry to impart softness to a textile by applying a modified polysiloxane, which contains amide groups or carbamate groups instead of amine groups. However, amide and carbamate groups do not provide the same desirable level of softness characteristic of the amine groups.

For example, another method for producing amine-functional siloxanes for use in fabric treatment agents is disclosed in "Structure Activity Relationships of Amino-functional Siloxanes as Components in Softening Finishes", *Textile Chemist and Colorist*, by Lautenschlager et al., published March 1995, Vol. 27, No. 3. Lautenschlager et al. disclose that epoxidation is not a viable alternative to an improved softener because of impurities formed during the reaction. Alternatively, Lautenschlager et al. disclose acylated aminofunctional silicones that can be used in fabric softening finishes, and a method for their preparation by acylation of an aminofunctional silicone fluid. The acylating agent can be an anhydride, lactone, or carbonate. However, the resulting acylated aminofunctional silicones exhibit a decline in hand when compared to standard aminosiloxanes.

Therefore, it is an object of this invention to provide a blend of siloxanes having amine- and polyol-functional groups that can be used in fiber treatment compositions.

U.S. Pat. No. 5,277,968 to Canivenc, Jan. 11, 1994, discloses a process for treating a textile fabric. The process comprises applying an aqueous emulsion of a polydiorganosiloxane to the fabric. The polydiorganosiloxane has secondary and tertiary amine-groups and hydroxyl-groups.

U.S. Pat. No. 5,118,535 to Cray et al., Jun. 2, 1992, discloses a method for treating fibrous materials comprising applying a composition containing a cyclic diamine functional polydiorganosiloxane. The composition can be a solution, dispersion, or emulsion.

EP A2 0 399 706 by Cray, published on Nov. 28, 1990, discloses a method for treating fibrous materials. The method comprises pre-reacting an amine-containing organosiloxane with a monoepoxide, and thereafter applying the resulting product to the fibers. The product has primary, secondary, and tertiary amine groups, where up to 10% of the amine groups are primary amine groups.

U.S. Pat. No. 4,311,626 to Ona et al., Jan. 19, 1982, discloses a composition containing an aminofunctional polydiorganosiloxane and a carboxylfunctional polydiorganosiloxane. The composition is used to treat fibers to impart smoothness, crease resistance, elongation recovery, and compression recovery. However, carboxyl groups detrimentally affect the hand of the treated fibers.

U.S. Pat. No. 4,366,001 to Ona et al., Dec. 28, 1982, discloses a fiber treating composition that contains at least 2 or 3 types of organofunctional siloxanes. The first is an amino-functional siloxane, the second is a carboxyl-functional siloxane, and the third is an epoxy-functional siloxane. At least one of the organofunctional siloxanes contains at least one polyoxyalkylene group. The composition provides antistatic character, moisture absorbability, stain resistance, pliability, smoothness and compression recovery.

However, none of these references disclose a fiber treatment composition that imparts hydrophilicity and provides resistance to yellowing to textile fibers, without a detriment to hand. Therefore, it is a further object of this invention to provide a fiber treatment composition that provides all of these desired properties.

SUMMARY OF THE INVENTION

This invention relates to a fiber treatment composition containing siloxanes having amine- and polyol-functionalities. The combination of amine- and polyol functionalities provides a synergistic effect in that the fiber treatment composition provides resistance to yellowing and provides hydrophilicity to the treated fiber without significant detriment to the hand of the fiber.

DETAILED DESCRIPTION OF THE INVENTION

This invention relates to a fiber treatment composition. The composition comprises
  (a) an amine-, polyol-functional siloxane, and
  (b) an epoxy-, glycol-functional siloxane.
Component (a), the amine-, polyol-functional siloxane, has a formula:

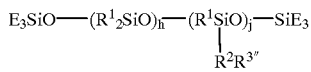

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; and j is 0.1 to 200. Each $R^{3''}$ is generally a heterocyclic nitrogen-containing compound, which may be, e.g.,

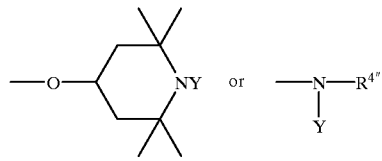

wherein each $R^{4'''}$ is independently selected from the group consisting of a hydrogen atom and a group of formula —$R^2NY_2$, each Y is independently a hydrogen atom or Y', and each Y' is a group of the formula

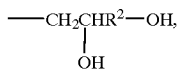

wherein $R^2$, which can be the same or different, is characterized as above, and with the proviso that every Y is not H.

Each E is an endblocking group independently selected from the group consisting of monovalent hydrocarbon groups, hydroxyl groups, and alkoxy groups. The monovalent hydrocarbon groups suitable as endblocking group E are monovalent hydrocarbon groups, preferably alkyl or aryl groups. When the endblocking group E is an alkoxy group, it preferably has 1 to 15 carbon atoms.

Each $R^1$ is independently a monovalent hydrocarbon group. $R^1$ is exemplified by alkyl such as methyl, ethyl, propyl, butyl, pentyl, and hexyl; aryl such as phenyl, tolyl, and xylyl; and aralkyl such as benzyl and phenethyl. Alkyl groups are preferred, and methyl is particularly preferred.

Each $R^2$ is independently a divalent hydrocarbon group of 1 to 10 carbon atoms. The divalent groups are exemplified by alkylene groups such as ethylene, propylene, butylene, isobutylene, and methylpropylene; and alkylene-arylene groups expressed by the formula —$(CH_2)_2$—$C_6H_4$. Alkylene groups such as ethylene, propylene, and isobutylene groups are preferred.

Preferably, $R^1$ is an alkyl group such as methyl, $R^2$ is an alkylene group such as isobutyl, h is 75 to 400, and j is 0.75 to 20.

Preferably, Y' is:

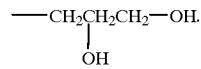

Preferably, $R^{4'''}$ is selected from:

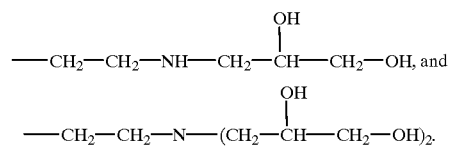

A preferred method to produce amine-, polyol-functional siloxanes is disclosed in European Patent Application No. 0 399 706 A2, published on Nov. 28, 1990. This method comprises reacting an amine-functional siloxane with an epoxy-functional compound.

More preferably, (a) the amine-, polyol-functional siloxanes used in this invention are prepared by the following method. First, component (i) an amine-functional siloxane is prepared by base equilibration using a catalyst. A preferred method comprises heating to 150° C., a composition comprising a polydiorganosiloxane; an endblocker, such as hexamethyldisiloxane; an amine-functional silane or amine-functional siloxane; and water in the presence of the catalyst. While heating, a mild strip is applied to the system to remove by-products such as water and alcohol. After formation of component (i), the reaction mixture can be further stripped to remove low boiling impurities from component (i).

In a particularly preferred embodiment of the invention, component (i) is formed by a condensation reaction process. The condensation reaction process comprises I) heating a mixture comprising silanol-endblocked polydimethylsiloxane, an alcohol, and an aminosilane, in the presence of a catalyst, and thereafter II) gradually reducing pressure to promote condensation polymerization by removing by-products from the reaction mixture.

The alcohol is preferably a blend of linear alcohols having 10 to 15 carbon atoms. Suitable alcohols are commercially available.

Component (i) the amine-functional siloxane has the general formula:

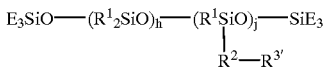

where $R^1$, $R^2$, h, and j are as described above, with h preferably being from about 75 to 400. $R^{3'}$ is generally a heterocyclic nitrogen-containing compound, which may be, e.g.,

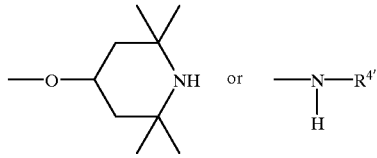

where each $R^{4'}$ is selected from the group consisting of a hydrogen atom and a group of the formula $-R^2NH_2$.

When (i) the amine-functional siloxane is prepared by the base equilibration process, each E is a monovalent hydrocarbon group, preferably an alkyl or aryl group. When the amine-functional siloxane is prepared by the condensation reaction process, each E is independently selected from the group consisting of monovalent hydrocarbon groups, hydroxyl groups, and alkoxy groups.

The amine-functional siloxane (i) is then reacted with (ii) an epoxy-functional alcohol compound to form (a) the amine-, polyol-functional siloxane, described above.

Component (ii) is an epoxy-functional alcohol compound having a general formula:

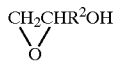

where $R^2$ is a divalent hydrocarbon group as described above. Suitable epoxy-functional compounds for component (ii) include glycidol, 2,3-epoxy-cyclopentanol, and 3,3-epoxy-6-methylcyclohexylmethanol. Glycidol is preferred.

Component (b) is an epoxy-, glycol-siloxane. Component (b) has the general formula:

wherein each $R^1$ is independently a monovalent hydrocarbon group, $R^6$ is an epoxy containing group, $R^7$ is a polyether group, each E is independently selected from the group consisting of a monovalent hydrocarbon group, a hydroxyl group, and an alkoxy group, h is 25 to 1000, j is 0.1 to 200, and k is 0.1 to 200.

Ingredient (b) can be prepared, for example, by a hydrosilylation reaction of a composition comprising (i) a polyorganohydrogen siloxane, (ii) an alkenyl-functional glycol ether, (iii) an alkenyl-functional glycidyl ether, (iv) a catechol compound, and (v) a hydrosilylation reaction catalyst.

Ingredient (i) preferably has the general formula:

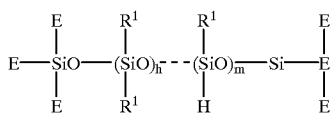

wherein E, $R^1$, h, and j are as described above, and m=j+k. Preferably, ingredient (i) is a trimethylsiloxy-terminated dimethyl, methylhydrogensiloxane.

Suitable alkenyl-functional glycol ethers are known in the art and are commercially available.

Ingredient (iii) is an alkenyl-functional glycidyl ether. Ingredient (iv) is a catechol compound. Suitable catechol compounds are known in the art and are commercially available.

Ingredient (v) is a hydrosilylation reaction catalyst. Suitable hydrosilylation catalysts are known in the art. For example, ingredient (v) may be any known platinum hydrosilylation catalyst.

The textile treatment composition may further comprise one or more optional ingredients. For example, the following optional ingredients can be added to the fiber treatment composition: (c) one or more surfactants, (d) an organic acid, (e) a carrier, (f) a thickener, (g), a crease resist resin, (h) an oil soluble colorant, (()) a water soluble colorant, (k) an organic fiber treatment compound, (l) an organosiloxane fiber treatment compound, and combinations thereof.

Ingredient (c) is one or more optional surfactants selected from the group consisting of cationic and nonionic surfactants. Nonionic surfactants are preferred. Ingredient (c) is added when the textile treatment composition is formulated as an emulsion. The amount of ingredient (c) is about 3 to 25 wt % of the emulsion.

The emulsion can further comprise optional ingredient (d), an organic acid. Ingredient (d) is preferably glacial acetic acid. The amount of ingredient (d) in the emulsion typically ranges from 0 to 2 wt %.

Ingredient (e) is a carrier selected from the group consisting of water, organic solvents, and silicone compounds. Suitable organic solvents include hydrocarbons such as aromatic hydrocarbons exemplified by toluene, benzene, and xylene; alkanes such as hexane and heptane; ketones such as acetone, methyl ethyl ketone, and methylisobutyl ketone; and alcohols. Ingredient (e) is preferably water. Suitable silicone compounds include low molecular weight dimethylsiloxane containing fluids.

The textile treatment composition can have any suitable form. For example, the composition can be applied to the textile neat. However, the textile treatment composition can be a solution, dispersion, or emulsion. Preferably, the textile treatment composition is an emulsion comprising:

i) a discontinuous phase comprising ingredients (a) an amine-, polyol-functional siloxane, and (b), an epoxy-, glycol-functional siloxane, ii) a continuous phase comprising ingredient (e), and iii) ingredient (c), one or more surfactants. Ingredient (d), an organic acid, is preferably added to the emulsion.

The combined amounts of active ingredients (a) and (b) in the emulsion is typically 2 to 80 wt %, preferably 10 to 30 wt % of the emulsion.

This invention further relates to a method for preparing a textile treatment composition. The method comprises combining ingredients (a) and (b) with any optional ingredients. Typically, ingredients (a) and (b) and any optional ingredients are combined by a process selected from the group consisting of dissolving, dispersing, and emulsifying.

Preferably, an emulsion comprising ingredients (a), (b), (c), and (e) is prepared. A method for the preparation of an emulsion of an organopolysiloxane is disclosed in U.S. Pat. No. 5,258,451, which is hereby incorporated by reference.

The textile treatment composition can also be prepared by independently combining ingredient (a) and ingredient (b) separately with optional ingredients to form a plurality of treatment agents. The plurality of treatment agents can then be combined before application to the textiles, or they can be applied to the textiles simultaneously or sequentially. For example, the textile treatment composition can be prepared by forming (1) a first treatment agent comprising ingredient (a) and ingredient (e) and (2) a second treatment agent comprising ingredient (b) and ingredient (e). Preferably, (1) the first treatment agent and (2) the second treatment agent are both emulsions, ingredient (e) is water, and (1) the first treatment agent further comprises one or more surfactants and the second treatment agent also further comprises one or more surfactants. Treatment agents (1) and (2) can then be mixed together and thereafter applied to the textiles. Alternatively, treatment agent (1) can be applied to the textiles, and thereafter treatment agent (2) can be applied to the textiles. Alternatively, treatment agent (2) can be applied to the textiles, and thereafter treatment agent (1) can be applied to the textile.

This invention further relates to a method for treating textiles. The method comprises applying the textile treatment composition to the textile and thereafter removing (e) the carrier, if any. The textile treatment composition can be applied to the textile by any convenient method. For example, the composition can be applied by padding, dipping, spraying or exhausting. When the textile treatment composition comprises more than 1 solution, dispersion, or emulsion; the solutions, dispersions, and emulsions can be applied simultaneously or sequentially to the textiles.

After the textile treatment composition is applied to the fabric, it can be dried by heating.

The textile treatment composition can be applied to the textiles during making the textiles or later, such as during laundering the textiles. After application, the carrier can be removed from the textile treatment composition by, for example, drying at ambient or elevated temperature.

The amount of textile treatment composition applied to the textile is typically sufficient to provide 0.1 to 15 wt % of the combined weights of ingredients (a) and (b) on the textile, based on the dry weight of the textile. Preferably, the combined amounts of ingredients (a) and (b) on the fibers is 0.2 to 1 wt % based on the dry weight of the textile.

The textiles that can be treated with the textile treatment composition described above include natural fibers such as cotton, silk, linen, and wool; regenerated fibers such as rayon and acetate; synthetic fibers such as polyesters, polyamides, polyacrylonitriles, polyethylenes, and polypropylenes; and combinations and blends thereof.

The textile treatment composition of this invention provides several advantages over compositions known in the art. This invention imparts both good hand and durable hydrophilicity to the treated textiles.

This invention further relates to a method for treating fibers. The method comprises applying the fiber treatment composition to the fibers and thereafter removing the carrier, if any. The fiber treatment composition can be applied to the fibers by any convenient method. For example, the composition can be applied by padding, dipping, or spraying. When the fiber treatment composition comprises more than 1 solution, dispersion, or emulsion; the solutions, dispersions, and emulsions can be applied simultaneously or sequentially to the fibers.

The fiber treatment composition can be applied to the fibers during making the fibers, during making a fabric from the fibers, or later, such as during laundering the fabric. After application, the carrier can be removed from the fiber treatment composition by, for example, drying at ambient or elevated temperature.

The amount of fiber treatment composition applied to the fibers is typically sufficient to provide 0.1 to 15 wt % of the active ingredient on the fibers, based on the dry weight of the fibers. Preferably, the amount of active ingredient on the fibers is 0.2 to 1 wt % based on the dry weight of the fibers.

The fibers that can be treated with the composition described above are not specifically restricted. Suitable fibers include natural fibers such as cotton, silk, linen, and wool; regenerated fibers such as rayon and acetate; synthetic fibers such as polyesters, polyamides, polyacrylonitriles, polyethylenes, and polypropylenes; and combinations and blends thereof.

The form of the fibers is not specifically restricted. The fiber treatment composition is suitable for use on threads, filaments, tows, yarns, woven fabrics, knitted materials, nonwoven materials, and others.

The fiber treatment composition of this invention has the following advantages:
1. the composition imparts hydrophilicity to the fibers,
2. the composition provides yellowing resistance to the fibers, and
3. the composition provides hydrophilicity and yellowing resistance without a significant detriment to the hand of the treated fibers. 'Hand' means the softness and smoothness of the fabric. The amine-functional groups provide superior hand to the fabric. The polyol and epoxy-glycol functionalities provide hydrophilicity and resistance to yellowing.

EXAMPLES

These examples are intended to illustrate the invention to those skilled in the art and should not be interpreted as limiting the scope of the invention set forth in the claims.

Reference Example 1

Emulsion samples were prepared by the following method.

1. The active ingredient was combined with 2 surfactants and a first charge of acid, and this mixture was stirred for 5–10 minutes. The surfactants used were GENAPOL® UD 050 and GENAPOL® UD 110. GENAPOL® UD 050 and GENAPOL® UD 110 are ethoxylated C11 branched and linear alcohols having CAS No. 127036242, available from Hoechst Celanese. The acid was glacial acetic acid.
2. A first water charge was added to the mixture from step 1, and the resulting mixture was stirred for 30 minutes.
3. A second water charge was added to the mixture from step 2, and the resulting mixture was stirred for 30 minutes.
4. A third water charge was added to the mixture from step 3, and the resulting mixture was stirred for 30 minutes.
5. A second acid charge and a fourth water charge were added to the mixture from step 4. The resulting mixture was stirred for 30 minutes.

The formulation of the emulsion samples is in Table 1. The emulsion samples were formulated to provide 1 wt % of the active ingredient on the fabric to which the emulsion was applied.

TABLE 1

Emulsion Formulation

| Ingredient | Amount (Weight % based on total weight of the emulsion) |
| --- | --- |
| Active Ingredient | 20 |
| GENAPOL ® UD 050 | 3 |
| GENAPOL ® UD 110 | 7 |
| $1^{ST}$ Acid Charge | 0.1 |
| $1^{ST}$ Water Charge | 4 |
| $2^{ND}$ Water Charge | 4 |
| $3^{RD}$ Water Charge | 41.9 |
| $4^{TH}$ Water Charge | 19.8 |
| $2^{ND}$ Acid Charge | 0.2 |

Reference Example 2—Evaluation of Emulsion Samples

Each emulsion sample was then applied to 100% cotton interlock knit fabric (TESTFABRICS® style #460). The treated fabric was dried at 150° C. for 3 minutes. The treated fabric was then conditioned at room temperature overnight.

The whiteness index, hand, and absorbency were then measured on each sample. Whiteness index is a dimensionless number computed from colorimetric data. Whiteness index was determined by averaging the results of 3 readings per sample with a HUNTERLAB® colorimeter, as described in ASTM E 313-96.

Hand is a relative measurement provided by a group of panel of experienced evaluators. Hand of each sample is ranked on a scale of 1 to X, X being the number of samples evaluated relative to each other. A rating of 1 indicates the best hand, i.e. softest and smoothest feel, and higher numbers indicate decreasing hand.

Absorbency is measured by AATCC (American Association of Textile Chemist and Colorist) Test Method 79-1995-Absorbance of Bleached Textiles. This method is: A drop of water is allowed to fall from a fixed height onto the taut surface of a fabric test specimen. The time required for the specular reflection of the water drop to disappear is measured and recorded as wetting time. Absorbency was measured after conditioning at room temperature overnight. In some examples, absorbency was measured again after aging the fabric 3 days later at 50 degrees C. Representative samples are listed in Table 2 below.

Examples

The following examples, as found in Tables 3–5 below, demonstrate the wettability, hand, and whiteness index of the materials of the present invention. Various treatments were performed on cotton knit fabric.

TABLE 3

| | Wettability (units in seconds) | | |
|---|---|---|---|
| Sample | 1 Day | 1 Wash | 3 Days Aging at 50° C. (simulates 1 month at room temperature) |
| A | <1 | 0 | 1.0 |
| B | 1.0 | 1.0 | 3.7 |
| C | <1 | 1.0 | 5.2 |
| D | 1.0 | 0 | 4.3 |
| E | 10.5 | 33.8 | 127.8 |
| F | <1 | 0 | 2.0 |
| G | <1 | 0 | 2.5 |
| Control | 0 | 0 | 0 |

For TABLES 3–5:
A: Emulsion of silicone quaternary functional siloxane and silicone polyether
B–D: See TABLE 2
E: Acylated aminofunctional silicone
F: 95 wt % Sample C + 5 wt % dimethyl, methylhydrogen siloxane reaction product allyl glycidyl ether and allyl (EO)(PO) methyl ether
G: 95 wt % Sample D + 5 wt % dimethyl, methylhydrogen siloxane reaction product allyl glycidyl ether and allyl (EO)(PO) methyl ether

TABLE 4

| Hand (units an average of three readings) | | |
|---|---|---|
| Sample | 1 Day | 1 Wash |
| A | 3.9 | 1.2 |

TABLE 2

| Sample | Active Ingredient |
|---|---|
| B | $(CH_3)_3SiO((CH_3)_2SiO)_{98}(CH_3SiO)_2Si(CH_3)_3$ with side chain $CH_2CHCH_2NXCH_2CH_2NXCH_2CHCH_2(OH)$, substituents $CH_3$ and $OH$; where 50% of all instances of X have formula —$CH_2CH(OH)CH_2OH$, and 50% of X is a hydrogen atom. |
| C | $ROSiO((CH_3)_2SiO)_{98}(CH_3SiO)_2Si(CH_3)_3OR$ with side chain $CH_2CHCH_2NXCH_2CH_2NXCH_2CHCH(OH)$, substituents $CH_3$ and $OH$; where 75% of all instances of X have formula —$CH_2CH(OH)CH_2OH$, and 25% of X is hydrogen |
| D | Sample C as above + 4 wt % excess alkoxy endblocker |

TABLE 4-continued

| Hand (units an average of three readings) | | |
| --- | --- | --- |
| Sample | 1 Day | 1 Wash |
| C | 4.4 | 3.3 |
| E | 4.5 | 5.0 |
| F | 4.5 | 3.6 |
| Control | 0 | 0 |

TABLE 5

| Whiteness Index (units an average of three readings) | | |
| --- | --- | --- |
| Sample | 1 Wash | 3 Days Aging at 50° C. |
| A | 110.4 | 84.6 |
| B | 106.0 | 78.4 |
| C | 108.5 | 80.0 |
| D | 107.8 | 79.6 |
| E | 106.7 | 77.8 |
| F | 108.4 | 79.5 |
| G | 107.1 | 80.2 |
| Control | 109.7 | 85.9 |

As noted in the above tables, the addition of the epoxy glycol significantly improves performance stability on fabric with aging.

We claim:

1. A fiber treatment composition comprising:

(a) an amine-, polyol-functional siloxane having a general formula

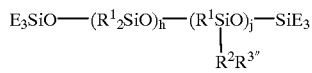

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; j is 0.1 to 200; and each $R^{3''}$ is a heterocyclic nitrogen-containing compound including

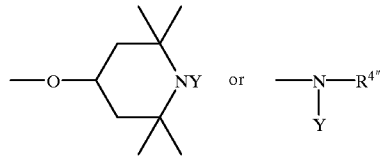

wherein each $R^{4''}$ is independently selected from the group consisting of a hydrogen atom and a group of formula $-R^2NY_2$, each Y is independently a hydrogen atom or Y', and each Y' is a group of formula

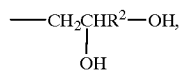

wherein $R^2$ groups are independently characterized as above, and the proviso that every Y is not H; and (b) an epoxy-, glycol-siloxane having the general formula $$E_3SiO-(R^1{}_2SiO)_h-(R^1R^6SiO)_j-(R^1R^7SiO)_k-SiE_3,$$

wherein each $R^1$ is independently a monovalent hydrocarbon group, $R^6$ is an epoxy containing group, $R^7$ is a polyether group, each E is independently selected from the group consisting of a monovalent hydrocarbon group, a hydroxyl group, and an alkoxy group, h is 25 to 1000, j is 0.1 to 200, and k is 0.1 to 200.

2. The composition of claim 1 further comprising (c) a carrier, and wherein ingredients (a) and (b) combined are present at 2 to 80 wt % of the composition.

3. The composition of claim 2, further comprising (d) an organic fiber treatment compound, (e) an organosiloxane fiber treatment compound, or a combination thereof, such that (d) and (e) are distinct from each other and components (a), (b) and (c).

4. The composition of claim 2, wherein the carrier is selected from the group consisting of water, organic solvents and silicone compounds.

5. The composition of claim 4, wherein the composition has a form selected from the group consisting of a solution and a dispersion.

6. The composition of claim 4, wherein the composition has a form selected from the group consisting of a dispersion and an emulsion.

7. The composition of claim 6, wherein the composition is an emulsion, ingredient (c) is water, and the composition further comprises ingredient (f), one or more surfactants.

8. The composition of claim 7, wherein ingredients (a) and (b) combined are present at 10 to 30 wt % of the emulsion.

9. The composition of claim 8, wherein the surfactant is selected from the group consisting of cationic and nonionic surfactants.

10. The composition of claim 7, further comprising greater than 0 to 2 wt %, based on the weight of the emulsion, of ingredient (g), an organic acid.

11. The composition of claim 10, wherein the organic acid is an acetic acid.

12. A method for treating textiles comprising:

1) applying to a fiber or textile, a composition comprising
(a) an amine-, polyol-functional siloxane having a general formula

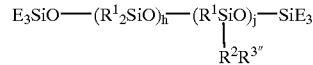

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; j is 0.1 to 200; and each $R^{3''}$ is a heterocyclic nitrogen-containing compound including

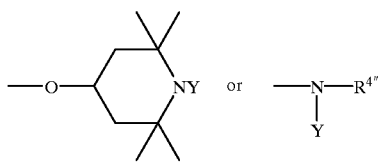

wherein each $R^{4''}$ is independently selected from the group consisting of a hydrogen atom and a group of formula —$R^2NY_2$, each Y is independently a hydrogen atom or Y', and each Y' is a group of formula

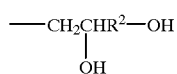

wherein $R^2$ groups are independently characterized as above, and with the proviso that every Y is not H; and (b) an epoxy-, glycol-siloxane having the general formula

wherein each $R^1$ is independently a monovalent hydrocarbon group, $R^6$ is an epoxy containing group, $R^7$ is a polyether group, each E is independently selected from the group consisting of a monovalent hydrocarbon group, a hydroxyl group, and an alkoxy group, h is 25 to 1000, j is 0.1 to 200, and k is 0.1 to 200; and (c) a carrier, and thereafter 2) removing the carrier.

13. The method of claim 12, wherein the method further comprises: 3) heating to dry ingredients (a) and (b).

14. The method of claim 13, wherein the composition is applied to the fiber or textile in an amount sufficient to provide 0.1 to 15 wt % of ingredients (a) and (b) combined on the fiber or textile.

15. A treated fiber or textile prepared by the method of claim 13.

16. The treated fiber or textile of claim 15, wherein the fiber or textile comprises a material selected from the group consisting of a) natural fibers; b) regenerated fibers; c) synthetic fibers; and combinations and blends thereof.

17. The treated fiber or textile of claim 15, wherein the fiber or textile comprises a material selected from the group consisting of cotton, silk, linen, wool, rayon, acetate, polyesters, polyamides, polyacrylonitriles, polyethylenes, polypropylenes and combinations and blends thereof.

* * * * *